(12) United States Patent
McWilliams et al.

(10) Patent No.: US 11,596,853 B2
(45) Date of Patent: Mar. 7, 2023

(54) INTEGRATED SPORTS HUB APPLICATION

(71) Applicants: Thomas J. McWilliams, Bryn Mawr, PA (US); Marc Fein, Wayne, PA (US); Scott Miltenberger, Rosemont, PA (US)

(72) Inventors: Thomas J. McWilliams, Bryn Mawr, PA (US); Marc Fein, Wayne, PA (US); Scott Miltenberger, Rosemont, PA (US)

(*) Notice: Subject to any disclaimer, the term of this patent is extended or adjusted under 35 U.S.C. 154(b) by 0 days.

(21) Appl. No.: 17/191,633

(22) Filed: Mar. 3, 2021

(65) Prior Publication Data
US 2021/0275893 A1  Sep. 9, 2021

Related U.S. Application Data

(60) Provisional application No. 62/984,666, filed on Mar. 3, 2020.

(51) Int. Cl.
*A63B 71/06* (2006.01)
*G06N 20/00* (2019.01)
*G06F 3/0481* (2022.01)
*H04L 65/60* (2022.01)

(52) U.S. Cl.
CPC ........ *A63B 71/0669* (2013.01); *G06F 3/0481* (2013.01); *G06N 20/00* (2019.01); *H04L 65/60* (2013.01)

(58) Field of Classification Search
CPC .. A63B 71/0669; G06F 3/0481; G06N 20/00; H04L 65/60
See application file for complete search history.

(56) References Cited

U.S. PATENT DOCUMENTS

| | | | |
|---|---|---|---|
| 2004/0143667 A1* | 7/2004 | Jerome | G06Q 30/02 709/228 |
| 2020/0074181 A1* | 3/2020 | Chang | G06K 9/00744 |
| 2020/0104601 A1* | 4/2020 | Karoui | H04N 21/6587 |
| 2021/0235156 A1* | 7/2021 | Richman | H04N 21/485 |

* cited by examiner

*Primary Examiner* — Roberto Borja
(74) *Attorney, Agent, or Firm* — Thomas J. McWilliams; Barnes & Thornburg LLP

(57) ABSTRACT

An apparatus, system and method for a youth sports hub. The foregoing may include: an artificial intelligence (AI) engine capable of integration with a plurality of third party applications; an application programming interface (API) capable of providing the integration; a hardware integrator capable of linking on-site hardware, including at least a video camera, a scoreboard, and an audio system, to the AI engine; and a graphical user interface (GUI) that is varied by the AI engine according to a user type as indicated by an account with the AI engine, and in which a user is presented with at least a computing interface that integrates simultaneous remote access to ones of the plurality of third party applications, a video feed from the video camera, a game score from the scoreboard, and in-game audio from the audio system, regarding a particular player in a particular game as identified by the account.

1 Claim, 1 Drawing Sheet

INTEGRATED SPORTS HUB APPLICATION

CROSS-REFERENCE TO RELATED APPLICATION

This application claims the benefit of priority to U.S. Provisional Application No. 62/984,666, filed Mar. 3, 2020, entitled INTEGRATED SPORTS HUB APPLICATION, the entirety of which is incorporated herein by reference as if set forth in its entirety.

BACKGROUND

Field of the Disclosure

The disclosure relates generally to youth sports, and, more particularly, to an apparatus, system, and method for an integrated sports hub application.

Background of the Disclosure

As youth sports has become a substantial growth industry in the United States as well as worldwide, computerized applications, or "apps", that relate to youth sports have proliferated. Such youth sports apps include apps that relate to the very basics of enabling game play, such as youth sports scheduling apps, real-time game tracking apps, statistical apps, youth sports recruiting and other profiling apps, video and/or data streaming apps, and the like.

However, as the number of the aforementioned apps increases, the convenience of the use of such apps decreases. For example, although in rare circumstances multiple types of youth sports related apps are capable of being integrated together, it is more often the case that a user or parent must look in one app for an upcoming schedule, in a second app for real-time game tracking when one is unable to attend, in a third app if video capabilities are available at the field and one wishes to video stream the game, and so on.

Further, the "app universe" thus created for youth sports does not include any encompassing of peripheral businesses to youth sports. By way of example, it is very common in youth sports that a "picture day" or days is held for the athletes, in which posed pictures of the athletes are taken for later purchase by families, guardians, and the like. However, these pictures are, in general, disconnected from the apps mentioned above, and thus do not and cannot include statistics or entail live action in-game photos, and cannot be placed into recruiting packages, be integrated with a team's schedule, or the like.

SUMMARY OF THE DISCLOSURE

An apparatus, system and method for a youth sports hub is disclosed. The foregoing may include: an artificial intelligence (AI) engine capable of integration with a plurality of third party applications; an application programming interface (API) capable of providing the integration; a hardware integrator capable of linking on-site hardware, including at least a video camera, a scoreboard, and an audio system, to the AI engine; and a graphical user interface (GUI) that is varied by the AI engine according to a user type as indicated by an account with the AI engine, and in which a user is presented with at least a computing interface that integrates simultaneous remote access to ones of the plurality of third party applications, a video feed from the video camera, a game score from the scoreboard, and in-game audio from the audio system, regarding a particular player in a particular game as identified by the account.

BRIEF DESCRIPTION OF THE DRAWINGS

The disclosure is illustrated by way of example and not limitation in the accompanying drawings, in which like references may indicate similar elements, and in which.

DETAILED DESCRIPTION

Figure 1:
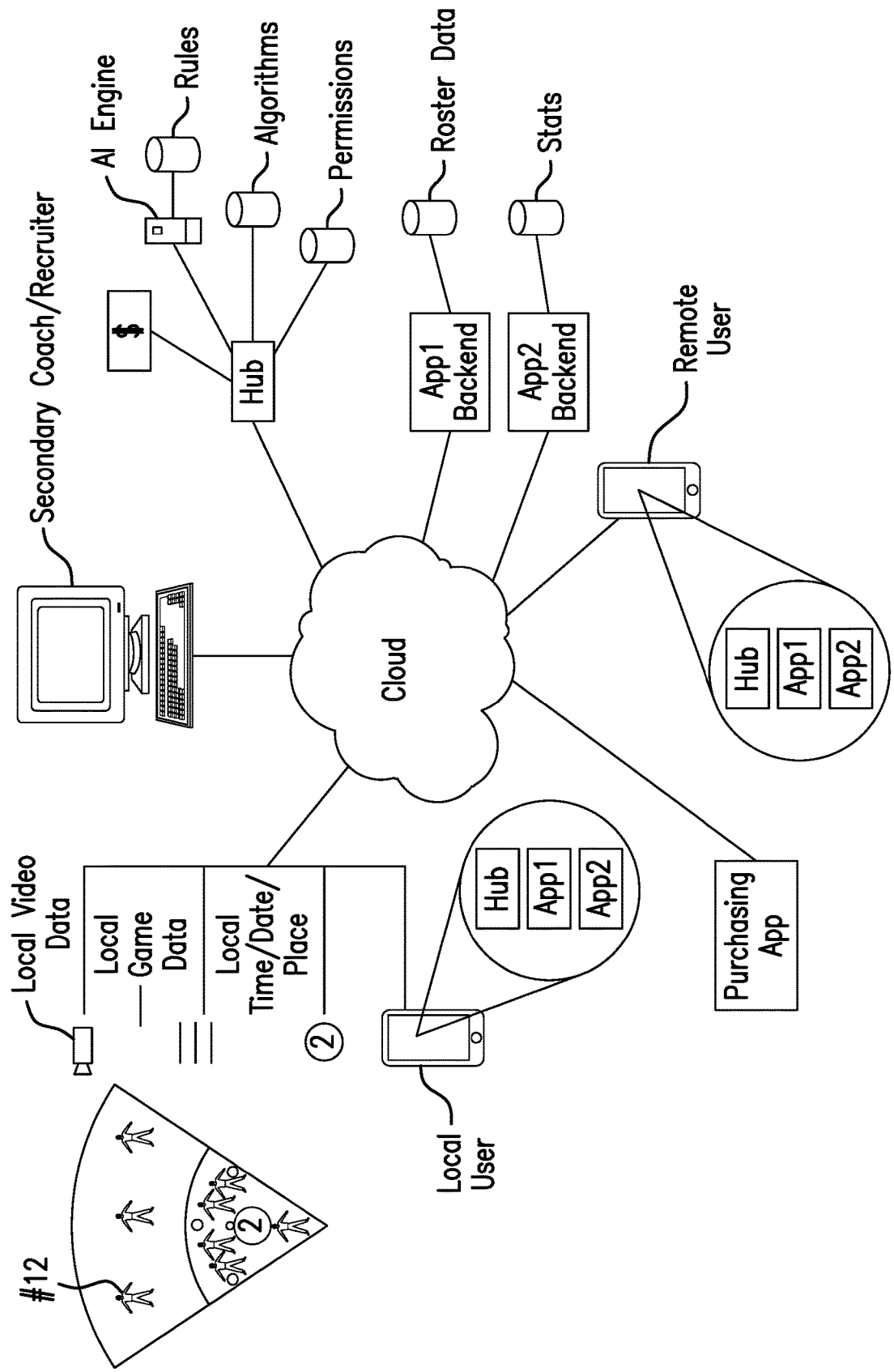
FIG. 1 illustrates aspects of the embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules, applications/apps, systems are disclosed herein that may provide access to and transformation of a plurality of types of digital content, including but not limited to video, image, text, audio, metadata, algorithms, interactive and document content, and data streams, and the algorithms applied herein track, deliver, manipulate, transform, transceive and report the accessed content. Described embodiments of these modules, apps, systems and methods are intended to be exemplary and not limiting. As such, it is contemplated that the herein described systems and methods may be adapted and may be extended to provide enhancements and/or additions to the exemplary modules, apps, systems and methods described. The disclosure is thus intended to include all such extensions.

An exemplary computing processing system for use in association with the embodiments, by way of non-limiting example, is capable of executing software, such as an operating system (OS), applications/apps, user interfaces, and/or one or more other computing algorithms, such as the recipes, algorithms, decisions, models, programs and subprograms discussed herein. The operation of the exemplary processing system is controlled primarily by non-transitory computer readable instructions/code, such as instructions stored in a computer readable storage medium, such as hard disk drive (HDD), optical disk, solid state drive, or the like. Such instructions may be executed within the central processing unit (CPU) to cause the system to perform the disclosed operations, comparisons and calculations. In many known computer servers, workstations, mobile devices, personal computers, and the like, CPU is implemented in an integrated circuit called a processor.

It is appreciated that, although the exemplary processing system may comprise a single CPU, such description is merely illustrative, as the processing system may comprise a plurality of CPUs. As such, the disclosed system may exploit the resources of remote CPUs through a communications network or some other data communications means.

In operation, CPU fetches, decodes, and executes instructions from a computer readable storage medium. Such instructions may be included in software. Information, such as computer instructions and other computer readable data, is transferred between components of the system via the system's main data-transfer path.

In addition, the processing system may contain a peripheral communications controller and bus, which is responsible for communicating instructions from CPU to, and/or receiving data from, peripherals, such as printers, keyboards, and/or the operator interaction elements on a mobile device as discussed herein throughout. An example of a peripheral bus is the Peripheral Component Interconnect (PCI) bus that is well known in the pertinent art.

An operator display/graphical user interface (GUI) may be used to display visual output and/or presentation data generated by or at the request of processing system, such as responsive to operation of the aforementioned computing programs/applications. Such visual output may include text, graphics, animated graphics, and/or video, for example.

Further, the processing system may contain a network adapter which may be used to couple to an external communication network, which may include or provide access to the Internet, an intranet, an extranet, or the like. Communications network may provide access for processing system with means of communicating and transferring software and information electronically. As such and for example, the GUI and applications/software discussed throughout may be provided locally ("thick client"), or may be provided remotely for local display ("thin client"). That is, communications network may provide for distributed processing, which involves several computers and the sharing of workloads or cooperative efforts in performing a task, as discussed above. Network adaptor may communicate to and from the network using any available wired or wireless technologies. Such technologies may include, by way of non-limiting example, cellular, Wi-Fi, Bluetooth, infrared, or the like.

The embodiments are and include a holistic solution for integrating a myriad of applications, or apps, and functionality particularly for youth sports. This integration occurs using a variety of novel means, including but not limited to one or more "hub" applications, and one or more integrated artificial intelligence (AI) engines. This integration allows for the providing of a universal youth sports portal.

FIG. 1 illustrates a hub application having an integrated artificial intelligence (AI) engine, suitable to integrate with a variety of apps and/or app functionality. The hub application may, as will be understood to the skilled artisan, itself be a youth sports application, such as a niche application that provides an API allowing integration to and from multiple other niche applications, or may be a dedicated hub application having a variety of API interfaces to enable integration therewith of a plurality of niche applications. The hub app may comprise hardware (such as dedicated servers, networking equipment, nodes, etc.), firmware, and/or software, and may preferably have a universal graphical user interface (GUI) that allows for integration of information from other applications, and such a GUI may be presented on a mobile device computer or a stationary computer.

In short, the hub app may provide a location to which a user may obtain all desired information for a given sport, or for multiple sports. Such integrated information may include various media types (data, scheduling, video, audio, training tools, etc.), as well as access to various functionality types (video player, purchasing, audio player, display interface, etc.).

As referenced above, it is often the case in youth sports that a single player, or multiple children within a single family, who plays or play sports may be members or a member of a variety of teams in different sports. For example, a player may play for a Little League baseball team, which team may differ as between the fall and the spring seasons; and an all-star tournament Little League team in the summer; an indoor wood-bat team in the winter; and one or more travel baseball teams over the course of all four weather seasons, by way of non-limiting example. Each of these teams may have different schedules for that player, and each team may have membership in different applications, such as the TeamSnap or Blue Sombrero scheduling apps; such as the GameChanger in-game data streaming and statistical tracking app; such as a high school, travel sports, or college player recruiting app; and such as a video streaming app to stream particular games; and each player may additionally have, for each of the aforementioned teams, a picture day, which may be separately scheduled (such as via email) from all of the foregoing. Needless to say, for the parent, guardian, or player him or herself, the aforementioned app universe thus becomes rather crowded, thereby leading to inefficient use or complete non-use of one or more apps related to the player's game play.

Of the apps mentioned above which are related to youth sports, the two most simplistic may generally be a typical scheduling app, and the statistical and in-game data tracking (and data streaming) app. As a threshold issue, either of these apps may serve as the hub app disclosed herein, or the hub app may be provided independently. In either case, a simplistic integration of the in game data streaming and statistics with the schedule may be readily provided by the hub, such as through use of the AI engine. More particularly, as the scheduling app may include a variety of player profile information, which may be similarly included in the game tracking app, the AI engine at the hub may allow for a "log in" by a guardian to both applications simultaneously, such that the information matching the player profile (which may include visual recognition data, such as a picture and/or uniform information) which is universally stored at or available to the hub (and which is also present in some form in both applications) may allow for the tying of the player to his or her schedule, his or her in game performance, and his or her statistics, such as through the universal intelligent tying provided by the AI engine.

The foregoing integration may be readily expanded to recruiting apps. For example, it is often the case that "recruiting packages" are put together for players: who hope to be recruited by local area travel sports teams; who hope to make high school level teams; or who hope to be recruited by colleges to play athletics. Needless to say, such as in a recruiting context, the providing by the hub of access to certain limited information by third parties, such as may be enabled by a guardian by providing particular credentials of the third party to allow that third party to temporarily or partially log in to the hub to see the limited information, may allow for access by that third party to a variety of hub-verified or certified information regarding the player.

Such verified information may include the player's schedule (so that a recruiter may go see the player play), and/or the player's statistics—each from the respective app that typically provides such information as referenced above. Further, allowances for such a limited login by third party may allow for the third party to access highlight reels, video, pictures, and/or in-game data streaming as discussed throughout, such as based on permissions granted by a guardian into the hub.

As referenced throughout, the hub application and AI engine may additionally allow for direct integration of so-called "picture day" into the fabric of youth sport apps. For example, rather than a guardian needing to watch a game through the lens of a camera, the AI engine may, such as using known AI visual recognition techniques, etc., recognize a variety of information regarding a particular player appearing in a picture or video and generally available in niche apps, including that player's schedule, statistics, in game performance, uniform number, team uniform color, and so on. Further, connection of the AI engine to the hub allows for all of this information to be known to the AI engine for the single player, even across multiple teams and/or multiple sports, via the interfaces to the multiple niche apps. Thus, picture packages may be made available based on the AI engine recognizing the particular player's team and uniform number for in-game shots, and/or integrating posed photos from a dedicated picture time in a scheduling app.

For example, many youth sports related apps allow for one parent or guardian watching a game to upload photos of that game, although those photos may include multiple players on a given team. The disclosed hub, working in conjunction with the AI engine, may recognize the player represented by the uploader of the pictures, what team that player is on, and may then be enabled to recognize other players on that team in the photos. Further, as the hub engine may allow for integration of schedules across multiple teams and for different players, the AI engine may allow for recognition of players not only on the same team, but also on the other team present in the uploaded photos, and may additionally make those photographs available to those other teams and/or other players (even if they are not members of a picture related aspect of the hub in their own right).

Of course, it may be appreciated by the skilled artisan in light of the discussion herein that certain security measures may be implemented by the AI engine because of the young ages of the players that are the subject of the embodiments. By way of example, while a guardian may certify only that she will allow her child/player to appear in pictures downloaded by other families having players on the same team, if the AI engine recognizes a player on the other team and allows for that other team to also download the pictures, the opponent's players may be subject to blurring of faces, cropping out from the pictures, or other security measures, such as may be automatically implemented by the AI engine (subject to the AI's plurality of stored rule sets, which rule sets may be modified over time, such as by machine learning based on user feedback) working in conjunction with the hub.

Moreover, the immediately aforementioned embodiment may allow for direct integration of pictures and/or video electronically with the hub application. That is, pictures may be made available electronically, rather than necessitating a physical order and/or a physical delivery, through the hub application by direct tying of the pictures (or video), once taken, to the player/team/league within the hub application by the AI engine. This is, needless to say, a significant improvement to the inefficiency inherent in current youth sports' "picture days", in which kids must show up at the appointed time, often not for a game but just for pictures; where kids must be later present to receive the physical pictures, often months after the taking of the pictures; and so on.

Furthermore, the hub engine may allow for control of cost-sharing mechanisms that may affect a variety of interested parties regarding pictures and/or the video streaming (and correspondent highlight packages) discussed throughout. For example, a picture day may still occur in which a professional photographer takes posed pictures of each player at a time scheduled in the scheduling app (and thus at a time and place known to the hub). As discussed throughout, these pictures may then be made available, along with in game pictures and/or video highlights, to the player through the hub app (and/or through one of its associated niche apps). However, the league or team may additionally provide in-game live action pictures at a first charge (or free of charge), while the professional photographer may provide a different charge for the afore-discussed posed pictures. Moreover, the hub application may allow for variability in these and other charges, such as wherein high definition pictures or video, lengthier highlight reels, montage pictures, pictures having verified statistics associated therewith, and the like may be subjected to an "up charge" over more basic picture packages. Needless to say, the hub may allow for any variability in the payments to any one of the involved parties, either through automation or by manual accounting based on provided data from the hub.

By way of example, and such as may be performed in conjunction with the pictures discussed above, the embodiments may allow readily for video streaming, such as to recruiters, grandparents, friends, or the like, who are unable to make it to a game at which video equipment is provided. In such a context, the aforementioned in-game statistical streaming apps known to the skilled artisan may readily integrate directly and in real time with a video streaming application, such that a given player's statistics may be provided in the video feed. Further, this providing of such statistics may be unique dependent upon who is viewing the video stream in accordance with the rules applied by the AI engine. For example, if a grandparent of a particular player is provided with a temporary login/link to the hub that allows for only viewing of video streaming and in-game data streaming of that player's games, when that grandparent is logged in and viewing the video stream, only that player's statistics may be provided to the viewing grandparent (or all statistics for that player's team may be shown, such as dependent on settings in the hub by the player, or team, or league, by way of example). Of course, it necessarily follows that log-in and viewing by other relations to that player or other players may be enabled to view only to the statistics of those other players. Further, and by way of example, certain statistics may be available to all viewers for all players, such as summary statistics like batting average or the like, while other statistics may be reviewable only to certain viewers. This variability in access may be controlled by the hub, such as using the recognitions provided in real time in the video by the AI engine, as discussed throughout.

As such, the AI engine, which is integrated with the hub as discussed throughout, may also readily integrate with the video stream. That is, the hub may allow for knowledge of a schedule of where a game is being played and what teams are playing in that game. Correspondingly, the video stream associated with that game may be subjected to the AI engine such that the AI engine may be able to pick out numbers on player jerseys and associate those numbers with players' faces and/or statures, by way of non-limiting example (based on the knowledge by the AI engine of who is playing in a game based upon from where, and when, the video feed is coming, and based on access to the roster of those teams granted to the AI engine by the hub in accordance with the hub's access to the roster information entered in a niche team scheduling app, such as by a team or league, for example). Thereby, once the hub allows for matching of a video stream to a team or teams and the rostered players of that team or teams (and, in some cases, other factors, such as jersey numbers, jersey colors, player heights and weights, etc.), all statistics incurred by each player during the game, as well as all actions taken by that player on the video during the game, may be tied to that player's profile in the hub. Accordingly, video snippets involving that player may be discerned by a party authorized to login to the hub on behalf of that player, such that video highlight packages, or still photos of live action extracted from the video, may be made available to recruiters or picture day purchasers, such as based on login credentials of those entities (and permissions regarding access to that player granted in those discretely-purposed credentials), as discussed herein.

Of course, the aforementioned video streaming may be provided by either the scheduling app or the in game data streaming app even absent integration with the disclosed hub, as mentioned above. Even in such cases, the embodiments also allow for the hub to integrate the video stream with information from "another" app (i.e., the non-native niche app to that video stream), i.e., if the video streaming app already resides in the in-game statistics app, the hub may also allow for integration of that stream with the scheduling app; and if the scheduling app is already integrated with a video stream from a game in the schedule, the embodiments may allow for integration of that video stream with the statistics tracking app using the hub and the AI engine.

Accordingly, the hub may integrate the features of multiple apps on a player-by-player basis, on a team-by-team basis, on a league-by-league basis, on a tournament-by-tournament basis, on a regional/geographic basis, and so on. Thus, the present invention does not preclude sales of niche apps in their current markets, but rather expands those available sales of niche apps, in conjunction with sales of the integration hub (and its AI engine), to expanded markets. For example, it may presently be the case that the statistics tracking/in-game data stream app discussed throughout is presently typically downloaded on a team-by-team basis, such as for a recurring (or termed) fee to that team. In contrast, the embodiments enable this in-game data app, in conjunction with the hub and its AI engine discussed throughout, to be sold on a league-by-league basis, which may currently be the present marketing level for the scheduling app discussed throughout.

Moreover, the embodiments discussed immediately above may also allow for integration with sales of video hardware. That is, a straight sales or a leasing model for hardware photographic or video equipment may be made available as a feature of a particular app. For example, to the extent such app provides video streaming, the purchase of that app, or the features thereof, by an entire league may include an optional component in which the league may additionally lease or buy a plurality of video streaming equipment for its fields (which may be either provided to the league for self-installation; or which may trigger a geographic assessment of local partner contractors local to the league to install such equipment). Of course, further layers of integration may occur, such as wherein a league obtains one or more fields worth of video streaming equipment in exchange for committing to buy, on behalf of all of its players' families, a particular number of picture and/or video highlight packages for its players, such as either per year or over the course of a predetermined number of years. Likewise, the video streaming equipment could be automatically tied by the hub to the sales of other app-services, such as playing equipment app purchases for the league's players or the like.

The foregoing may thus be made available via a variety of methodologies. For example, time-limited subscriptions may provide access to the hub app; to individual niche apps available through the hub (i.e., stats tracking only, etc.); to video streaming of games (i.e., to grandparents, etc.), such as per season or per tournament, for example; and so on. Integration of wifi or similar local networks may also form part of the embodiments, such as may or may not be part of the provided subscription services. By way of example, on site wifi network capabilities may be sold on subscription to sports facilities, and, as part of these wifi subscriptions, capabilities for video streaming of games on-site (such as installation of cameras, with or without an additional fee) may be provided. Similarly or in addition, existing on-site capabilities (such as video cameras, scoreboards, audio systems, and so on) may be integrated with the provided wifi/networking subscription, such as for no additional fee beyond the network subscription, or for an additional fee. Accordingly, current "smart home" integration and network capabilities may be carried to sports fields and arenas, according to the embodiments, when networking capabilities (i.e., wifi) are provided, such a via a subscription.

Computing efficiencies are thus substantially improved by the disclosed embodiments over the known art. For example and as discussed throughout, the integration of the AI engine to the hub allows for real time decision-making and apportionment by the hub of what is occurring in a given game. That is, the AI engine (such as using the aforementioned existing AI in-video recognition apps, such as from Microsoft) may recognize between inning warm-ups, occasions when no players or on the field, the absence of players because of a rain delay, visits to the mound, and the like, and such instances may not be stored from the video stream to save on data storage space based on AI recognition of such events (or such instances may not be streamed so as to not unnecessarily use bandwidth). Further, as the integration with the scheduling app disclosed herein enables knowledge on behalf of the hub of specifically what teams and in what location a game is being played, the storage of any maintained video need only occur, and/or may be partitioned and/or discretely stored in a distributed manner, in relation to those teams, that league, that geographic area, or the like. Accordingly, a particular data charge may be readily assessed on a per team or per league basis, by way of non-limiting example, and broader storage needs become unnecessary.

Finally, it will be appreciated by the skilled artisan that numerous other aspects and apps or app features may be integrated with the hub and the AI engine based on the discussion throughout. For example, coaches' forums may be provided in which training and coaching chat rooms and/or aids, such as including video, may be provided in the embodiments. This may be done via an additional integrated niche app, such as may provide links to the tools or information (such as may be discerned by the AI engine as the top 10 search results for other coaches, or the 25 most-liked search results based on in-app likes, etc.).

More particularly, video of a given player, such as that coach's player(s), may be broken down based on the application of known algorithms to the in-game video performance. More particularly, as numerous performance algorithms for certain sports are well known, such as the proper mechanics of a baseball swing, assessment of bat speed and launch angle for a baseball swing, rotation rate of a pitch, arc angle of a jump shot, serve velocity, and the like, a player's video (associated with that player in the hub by the AI engine) may be subjected to such algorithms, and that player's performance provided to a coach (or to the player, or to a recruiter, etc.). Needless to say, this service may be free or may be accorded a fee, but in either instance the coach (or the player, recruiter, etc.) may then receive extensive knowledge that the coach did not have prior to that occurrence.

Of course, it will also be appreciated that, as many players in a variety of a sports have secondary, professional coaches in addition to their "team coaches", that such coaching or training videos may also be provided, such as inclusive of application of the aforementioned algorithm(s), to those secondary coaches, either at the direction of the player or the like, based on permissions in the hub accorded to particular logins or credentials. For example, after each game, a video of all of a given player's at-bats, with one or more algorithms applied thereto and embedded (such as in the form of graphics/metadata) within the video, may be automatically emailed as links to the videos to a secondary hitting coach of that player, based on that player's profile in the hub.

Of course, the disclosed integration may thus also include practice facilities. That is, camera integration at a practice facility to an in-house network may allow for real time relaying to, or remote storage for later access from (such as to preserve limited local storage space), a remote display. The remote display may be for a parent who wishes to view the on-site teaching for any of a variety of reasons, or for another coach. The "remote" coach may wish to view remotely to insure compliance of teachings between the coaches; to tailor a training program to another training program; to tailor an exercise regimen to a training program; and so on. Of course, these training videos may also integrate with training hardware/software (i.e., swing-trackers, pitch speed/spin trackers, training trackers, etc.) to provide holistic training review at a later time or at a remote location.

It goes without saying that these video and algorithmic aspects may also be particularly relevant in contexts where an independent verification of data may be needed (and may be provided by the hub), such as in the creation of recruiting packages. For example, a player may be enabled to include in a recruiting package a highlight reel in which a verified swing velocity and launch angle are embedded correspondent to videos of certain swings, and/or may additionally include a variety of embedded seasonal or lifetime statistics into certain frames of a video highlight real.

This independent verification may also occur via the aforementioned integration by individual sports facility. That is, a sports facility may receive a verification of all data produced therefrom along with its services subscription with which it receives the integration of its cameras, scoreboard, wifi network, etc. The embodiments can thereby provide wireless networking to all in attendance, and align with a verified, integrated experience (i.e., camera integration with scoreboard, as well as recognition of players on-camera with a display of name, statistics, etc., for that player) for remote display and/or data provision over a network, such as the in-facility integrated wifi network.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. A sports hub, comprising:
an artificial intelligence (AI) engine capable of integration with a plurality of third party applications;
an application programming interface (API) capable of providing the integration;
a hardware integrator capable of linking on-site hardware, including at least a video camera, a scoreboard, and an audio system, to the AI engine; and
a graphical user interface (GUI) that is varied by the AI engine according to a user type as indicated by an account with the AI engine, and in which a user is presented with at least a computing interface that integrates simultaneous remote access, varied by the user type, for at least a familial relation and a prospective recruiter, wherein the remote access for the prospective recruiter user type is controlled by a user with the remote access for the familial relation user type, to ones of the plurality of third party applications, a video feed from the video camera, a game score from the scoreboard, in-game audio from the audio system, swing mechanics data determined from the video feed, and highlight reels composed from the video feed and the audio system, regarding a particular player in a particular game as identified by the account and as recognized in at least the video feed by the AI engine as being identified by the account.

* * * * *